Patented Apr. 13, 1943

2,316,481

UNITED STATES PATENT OFFICE 2,316,481

HALOGENATED POLYMERS OF ETHYLENE

Donald Whittaker, Northwich, England, assignor to Imperial Chemical Industries Limited, a corporation of Great Britain No Drawing. Application January 6, 1941, Serial No. 373,380. In Great Britain January 16, 1940

4 Claims. (Cl. 260—94)

This invention relates to halogenated polymers of ethylene and more particularly to the stabilisation of such polymers to the action of light.

These halogenated polymers of ethylene to which this invention relates may be obtained by the process described and claimed in British Patent No. 481,515, according to which normally solid polymers of ethylene (hereinafter referred to as polythenes) are subjected to the action of one or more halogens or halogen compounds capable of introducing halogen, e. g. iodine chloride, preferably in the presence of halogen carriers such as iodine, an aluminium halide or a ferric halide.

The properties of halogenated polythenes vary with the nature of the original polythene and with the nature and proportion of the halogen contained therein and with the method of chlorination. For example, a typical halogenated polythene containing 50% chlorine (obtained from polythene of molecular weight 12,000) is a tough, flexible, thermoplastic material. Halogenated polythenes may be used for various purposes, e. g. the formation of films, tapes and threads; coating or impregnating materials such as paper or fabric; and for electrical insulation.

The commercial uses of halogenated polythenes are at present restricted owing to the slight instability of halogenated polythenes to the action of heat and light. On exposure to heat and/or light they tend to give off halogen acids and/or to darken in colour. The evolution of halogen acids is a disadvantage in all cases where the acid may have deleterious effects, such as in electrical insulation and in impregnated paper or fabric. The darkening of colour is often a disadvantage in that the appearance of articles made from halogenated polythenes may suffer, or the transparency of the product may be impaired. In some cases the physical properties of the material may alter along with, or as a result of, this halogen acid evolution or colour darkening. For example, the solubility of the products in organic solvents may be decreased or the tensile strength and flexibility may be diminished, and the product may become brittle.

According to this invention, the adverse effect of light, which is due to ultraviolet radiation of wavelength less than 3400 A., can be prevented by the incorporation of a small proportion, e. g. 0.5–10% by weight of the composition, of stabilisers which themselves absorb radiation of wavelength up to 3400 A., without themselves undergoing chemical decomposition to substances which have not this property. The stabilisers used are compatible with halogenated polythenes, and generally also with fillers, pigments, dyes and plasticisers.

For example, an ester of an aromatic acid, especially benzoic acid with a monohydric, dihydric or trihydric phenol, or of two or more such esters; salicylic acid or an ester thereof, e. g. methyl salicylate, phenyl salicylate or n-butyl salicylate; benzal acetophenone; aesculin. These substances all possess the property of absorbing ultraviolet radiation of wavelength less than 3400 A. On the other hand, benzophenone is not an effective stabiliser: it absorbs light of this wavelength but itself becomes transparent to this radiation due to chemical change.

The stabiliser may be incorporated with the halogenated polythene by any convenient method, e. g. by mixing on heated rollers, by dissolving the stabiliser in a solution of halogenated polythene and evaporating the solvent, or by suspending the stabiliser in a solution of halogenated polythene in which it is not soluble, and precipitating the halogenated polythene in a state of intimate mixture with the stabiliser by adding a liquid which is miscible with the solvent but is itself a non-solvent for the halogenated polythene and the stabiliser under the conditions of working.

The invention is illustrated, although not restricted by the following examples.

Example 1

Films of chlorinated polythene containing 48% of chlorine, prepared from polythene of mean molecular weight 20,000, were irradiated with light from a mercury arc for periods of from one to a hundred hours. Films of the same chlorinated polythene with which 2% of resorcinol dibenzoate had been incorporated were irradiated for equal periods and the colours of the irradiated stabilised specimens were compared with those of the irradiated unstabilised specimens. It was found that the stabilised specimen which had been irradiated for 80 hours was of roughly the same colour as an unstabilised specimen after 24 hours irradiation By replacing the rescorcinol dizenzoate by an equal proportion of pyrogallol tribenzoate, a product was obtained which required 48 hours irradiation to reach the same colour as the unstabilised specimen after 24 hours irradiation.

Example 2

Films of chlorinated polythene containing 48% of chlorine, prepared from polythene of mean molecular weight 20,000, were irradiated with light from a mercury arc for periods of from one to a hundred hours. Films of the same chlorinated polythene with which 2% of phenyl salicylate had been incorporated were irradiated for equal periods and the colours of the irradiated stabilised specimens were compared with those of the irradiated unstabilised specimens. It was found that the stabilised specimen which had been irradiated for a hundred hours was of roughly the same colour as an unstabilised specimen after 24 hours irradiation.

By replacing the phenyl salicylate by an equal proportion of n-butyl salicylate, a product was obtained which required 48 hours irradiation to reach the same colour as the unstabilised specimen after 24 hours irradiation.

The invention is applicable to halogenated polythenes derived from polythenes of average molecular weight ranging from 2000 upwards, also to halogenated semi-solid or grease-like products containing a substantial proportion of solid polymers of ethylene, such as may be obtained by one form of the process of Specification 481,515. The halogenated polythenes are usually solids, but those derived from polythene of relatively low molecular weight or from the said semi-solid or grease-like products may be semi-solid or liquid. Solutions of halogenated polythenes may also be stabilised by the addition of such stabilisers of the kind described as are soluble therein.

Halogenated polythenes of all halogen contents may be treated according to the invention. Generally the halogenated polythene will contain between 2 and 70 per cent. by weight of halogen. At present the chlorinated polythenes are the halogenated polythenes of greatest technical interest, in particular those derived from polythenes of average molecular weight over 4000 and having a chlorine content between 20 and about 65 per cent.

Having now particularly described and ascertained the nature of my said invention and in what manner the same is to be performed, I declare that what I claim is:

1. A composition of matter comprising a halogenated ethylene polymer and a small amount of a substance selected from the class of aromatic oxygen containing compounds of the class consisting of salicylic acid, and esters of aromatic acids with monohydric, dihydric and trihydric phenols.

2. A process for stabilizing a halogenated ethylene polymer against the deteriorating action of heat and light, said process comprising incorporating into said polymer a small amount of a stabilizing agent selected from the class of aromatic oxygen containing compounds of the class consisting of salicylic acid, and esters of aromatic acids with monohydric, dihydric and trihydric phenols.

3. A process for stabilizing a halogenated ethylene polymer against the deteriorating action of heat and light, said process comprising incorporating into a solution of said polymer in organic solvent a small amount of a stabilizing agent selected from the class of aromatic oxygen containing compounds of the class consisting of salicylic acid, and esters of aromatic acids with monohydric, dihydric and trihydric phenols.

4. The composition of matter defined in claim 1 in which said substance is phenyl salicylate.

DONALD WHITTAKER.